Nov. 25, 1952   E. PAKALUK ET AL   2,619,053
PIE AND TART FLUTER
Original Filed April 12, 1948
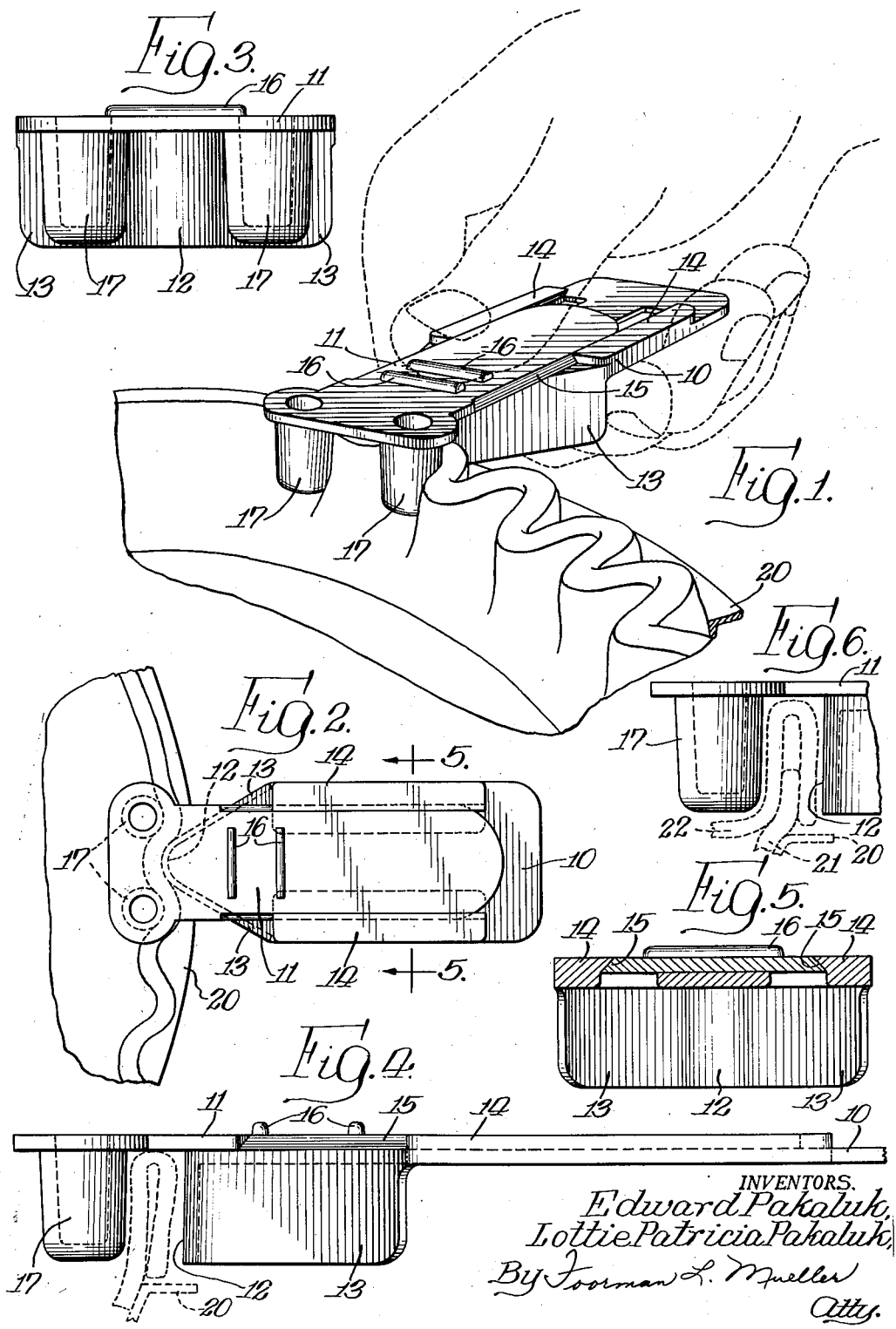
INVENTORS.
Edward Pakaluk,
Lottie Patricia Pakaluk,
By Foorman L. Mueller
Atty.

Patented Nov. 25, 1952

2,619,053

UNITED STATES PATENT OFFICE 2,619,053

PIE AND TART FLUTER

Edward Pakaluk and Lottie Patricia Pakaluk, Chicago, Ill.

Substituted for abandoned application Serial No. 20,568, April 12, 1948. This application February 23, 1950, Serial No. 145,708

5 Claims. (Cl. 107—49)

This invention relates generally to a pastry fluter and more particularly to a device for forming the edges of pastry for sealing the same and imparting an attractive appearance thereto. This is a substitute for the application filed April 12, 1948, as Serial No. 20,568.

When making a pie, tart, or the like, the pastry from which the crust is formed is normally rolled out in a flat layer and positioned on a pie pan or other baking dish. The pastry is then filled with any desired material and a second layer of pastry may be provided above the filling material. Whether or not a second layer is used, the pastry at the edge of the pan is formed to provide an attractive appearance. The forming of the edges of the pastry for a two crust pie is also effective to seal the crusts together so that the filling which may include juice will not run out between the crusts of the pie. The formed edge of a one crust pie may also serve to prevent the filling, which may expand while the pie is baked, from flowing over the edge of the piecrust.

In the prior art such forming of the edge of pastry for a piecrust has generally been done by hand or by improvised articles. Devices for forming the edges have been available but these devices have been of complicated construction and difficult to operate and/or have not formed the edge in a manner which is entirely satisfactory.

It is, therefore, an object of the present invention to provide a pastry fluter which is of simple construction and which is easy to operate.

A further object of this invention is to provide a pastry fluting device which provides an effective seal between engaging edges of pastry and at the same time imparts an attractive appearance thereto.

Another object of this invention is to provide a device for fluting the edge of a pie which forms an upstanding, relatively rigid, corrugated edge on the piecrust.

A feature of this invention is the provision of a simple fluting device which can be held in the hand and which is operated by a slide engaged by one finger of the hand.

A further feature of this invention is the provision of a fluting device made of two relatively slidable members having projections thereon between which the edges of pastry may be received to be formed by engagement of the projections therewith.

Another feature of this invention is the provision of a fluting device having a base member with a nose shaped projection and a slide member with cylindrical projections extending therefrom which are symmetrically positioned with respect to the nose and which may be moved into engagement with the sides of the nose as the slide moves with respect to the base member.

Further objects, features and advantages will be apparent from a consideration of the following description taken in connection with the accompanying drawings in which:

Fig. 1 is a positive view illustrating the fluting device and the manner in which it is used;

Fig. 2 is a top view of the device positioned with respect to a pie;

Fig. 3 is a front view of the fluting device;

Fig. 4 is a side view showing the fluting device positioned with respect to the pastry of a one crust pie;

Fig. 5 is a cross sectional view along the lines 5—5 of Fig. 2; and

Fig. 6 illustrates the use of the device for making a double crust pie.

In practicing the invention there is provided a pie fluter in the form of a two piece device including a first member which forms the base on which the second member is slidable. Both members have portions extending substantially perpendicular to the direction of movement between the members, with the projections being movable away from each other to be positioned on opposite sides of the edge of a piecrust, and being movable together to engage the piecrust and flute the edge thereof. The projection on the base member may be in the form of a nose and the projection on the slide may be in the form of two cylindrical pins positioned symmetrically with respect to the nose so that engagement of the device with an upstanding edge of pastry which forms a pie crust will impart a curved corrugation thereto.

Referring now to the drawings, in Fig. 1 the device is illustrated as including an elongated base member 10 on which a top member 11 is slidably supported. As illustrated, the base member is of such configuration to be easily held in the hand of the person using the device, with the thumb of the hand engaging the slide 11. Extending downwardly from the base member 10 is a projection including a rounded nose 12 and rearwardly extending skirts 13. The top or slide member 11 is positioned by a pair of spaced dovetail rails 14 on the base member 10. The slide has slanting edges 15 which fit with the dovetail rails so that the slide member is firmly supported with respect to the base member. Two ribs 16 are provided on the top surface of the slide to provide secure engagement of the slide by the thumb of the user.

Two cylindrical projections or pins 17 are provided on the slide and are positioned symmetrically with respect to the nose 12 on the base member. The pins are spaced so that when the slide is drawn back on the base member the pins 17 are positioned on either side of the nose. The pins extend perpendicular to the slide and have a length substantially the same as that of the nose on the base member. The nose portion 12 and the cylindrical portions 17 form the fluting surfaces and the parts thereof which engage the pastry are substantially parallel so that the pastry therebetween is uniformly formed and is not substantially compressed.

As previously stated, the fluter is used for forming the edge of the pastry which forms the crust of a pie, tart or the like, and may be used for forming the pastry edge of either one crust or two crust pies. Figs. 1, 2, 4 and 6 show the cooperation of the device with a pie provided in a pan 20. In making a one crust pie, the single pastry layer is allowed to extend over the edge of the pie pan by a substantial extent which may be of the order of one inch. This edge is then doubled over as indicated in Fig. 4 to form an upstanding edge extending above the pan 20. This upstanding edge is formed into a curved corrugated edge as shown in Figs. 1 and 2 by holding the fluter in the hand with the base thereof supported with the back of the skirt 13 against the forefinger and the bottom of the thumb between the ribs 16 on the top of the slide. The fluter may be dipped in flour to prevent it from sticking to the pastry crust. The fluter then is placed over the upstanding edge with the round pins and nose positioned on opposite sides of the edge. Then by moving the thumb and the forefinger toward each other the pins and the nose are drawn together to form the first flute. It is to be noted that it is not necessary to mash the pastry crust substantially by the pins and the nose in order to provide a curve therein for forming a flute. The next flute is begun where the first one ends and so on until the complete edge of the pie is fluted. The fluting of the upstanding edge serves to stiffen the edge so that it remains upstanding while the pastry is baked and serves to prevent overflow of the filling within the piecrust.

In the use of the fluting device with a two crust pie, the pastry for the crust is formed as shown in Fig. 6. The bottom layer of pastry 21 is cut off substantially even with the outer edge of the pie pan and the top layer 22 is allowed to extend beyond the pan for approximately an inch. The top layer is then doubled back and the edge of the bottom layer is positioned therebetween, with the edges of the two layers forming an upstanding collar above the pie pan. The upstanding edge is then fluted in the same manner as in a single crust pie and as fully explained above.

It is seen from the above that there is provided a fluting device of very simple construction which may be easily operated to provide an attractive edge on a pie crust. The fluting device is effective to seal the top and bottom pastry layers of a two crust pie and to form an upstanding rim on a single crust pie to prevent overflow of the filling therein. A small amount of butter or other shortening may be placed between the two members of the fluter to serve as a lubricant to provide easy operation thereof. The two piece construction makes it easy to wash the fluter for cleaning the same.

Although one embodiment of the fluting device has been disclosed which is illustrative thereof, it is obvious that various changes and modifications can be made therein without departing from the intended scope of the invention as defined in the appended claims.

We claim:

1. A device for fluting an edge on pastry including in combination, a pair of superimposed slidably connected members, one of said members having projections on both sides thereof which extend in opposite directions relative to one another, with said projections on one side comprising a pair of raised guide tracks acting to slidably receive the other member therein for relative slidable movement, and with said projections on the other side of said one member comprising a centrally placed nose for engagement with the pastry, and the other of said members having projecting means comprising a pair of portions spaced apart relative to said nose and positioned to have the latter project between said portions upon slidable contraction of the two members by movement of one of said two members.

2. A device adapted to be held in the hand and operated by the fingers of the hand for fluting an edge on pastry including in combination first and second members, edge fluting means on each member and extending laterally in the same direction from each member and positioned to cooperate one with the other for fluting an edge on pastry, and means for interconnecting said first and second members for relative longitudinal movement of said members by finger movement to bring said fluting means in and out of edge fluting engagement one with the other, said interconnecting means comprising a pair of raised guide tracks on one member and an elongated body portion on the other of said two members with two opposite outer edges thereof positioned in said guide tracks and movable relative thereto.

3. A device for fluting an edge on pastry including in combination, first and second members interconnected for longitudinal relative movement, said first member having a pair of laterally extending spaced apart portions thereon, said second member having a nose section laterally extending therefrom in the same direction as said spaced apart portions extend from said first member, means for slidably interconnecting said two members so as to position the nose section medially of said pair of spaced apart portions when they are in edge fluting position, and with said device adapted to be held in the hand for operation, and with one of said two members being slidable by finger movement relative to the other.

4. A device for fluting an edge on pastry including in combination a pair of interconnected fluting members, one of said members having a lateral projection thereon and the other member having a pair of lateral projections thereon spaced apart a distance such that the lateral projection on said one member is medially relative thereto when the projections are in edge fluting position, and means for interconnecting said members for slidable relative movement, with all of said lateral projections being on the same side of the device and operating in the same plane to press a pastry edge between the single projection and the pair of projections.

5. A device for fluting an edge on pastry including in combination first and second interconnected members, said first member having a projecting nose extending laterally therefrom, said second member having a pair of crimping fingers extending laterally therefrom in the same direction as said projecting nose, means for interconnecting said first and said second memgers for slidable relative movement, and with said nose lying in the same plane of operation as said crimping fingers for said slidable relative movement and positioned intermediate said crimping fingers when in edge fluting position.

EDWARD PAKALUK.
  LOTTIE PATRICIA PAKALUK.

REFERENCES CITED

The following references are of record in the file of this patent:

UNITED STATES PATENTS

| Number | Name | Date |
|---|---|---|
| 1,064,404 | Walker | June 10, 1913 |
| 1,593,793 | Chapin | July 27, 1926 |
| 1,906,854 | Heinrich | May 2, 1933 |
| 2,086,464 | Brown | July 6, 1937 |
| 2,444,857 | Smith | July 6, 1948 |